a corporation of Delaware

United States Patent Office

2,863,889
Patented Dec. 9, 1958

2,863,889
METHOD FOR RECOVERING FLUORINATED STABILIZER

Barnard Mitchel Marks, Wilmington, Del., assignor to E. I. du Pont de Nemours and Company, Wilmington, Del., a corporation of Delaware No Drawing. Application September 18, 1956
Serial No. 610,661

2 Claims. (Cl. 260—408)

This invention relates to a process for the recovery of stabilizing agents employed in the polymerization of tetrafluoroethylene, and more particularly to a recovery of valuable fluorinated stabilizing agents in the presence of larger quantities of non-ionic unfluorinated dispersing agents.

Aqueous dispersions of high molecular weight polytetrafluoroethylene are obtained by the polymerization of tetrafluoroethylene in an aqueous medium, employing ammonium and alkali metal salts of highly fluorinated acids as stabilizing agents for the dispersed polymer. These dispersion polymerization methods are described in greater detail in U. S. Patent 2,559,749, issued to A. F. Benning on July 10, 1951, and U. S. Patent 2,559,752, issued to K. L. Berry on July 10, 1951. The dispersion obtained from these processes contains from 30 to 45% of colloidally dispersed polytetrafluoroethylene. Although the salts of the fluorinated acids will stabilize aqueous polytetrafluoroethylene dispersion during formation, the stability of the resulting dispersion toward mechanical shear such as is involved in pumping etc., is low. The stability of the dispersion with respect to such treatment is improved by the addition of non-ionic phenoxypolyethers obtained from the condensation of a phenol with ethylene oxide. The stabilized dispersion may then be subjected to further treatment, such as concentration, as disclosed in copending application Ser. No. 356,584, filed may 21, 1953, now abandoned, to obtain dispersion containing from 60 to 75% of colloidal polytetrafluoroethylene or such treatments as coagulation under high shear stress, which gives rise to fibrous polytetrafluoroethylene, particularly useful as gasket material. In either case a clear liquid phase free of polytetrafluoroethylene, is obtained which contains both the fluorinated stabilizing agent and the non-ionic dispersing agent. Due to the high cost of preparing fluorinated stabilizing agents, it would be highly desirable to recover the fluorinated stabilizing agent present in the liquid after polymer removal.

It is, therefore, the primary object of the present invention to provide a process for the recovery of the dispersing agents employed in the preparation of aqueous dispersions of polytetrafluoroethylene. It is a further object to separate fluorinated dispersing agents from non-ionic dispersing agents employed in the preparation of aqueous dispersions of polytetrafluoroethylene.

The objects of the present invention are accomplished by heating a solution having therein dissolved a salt of a fluoroalkanoic acid having the general formula:

$$X—(CF_2)_nCOOH$$

wherein X is a hydrogen or a fluorine atom and $n$ is a whole number from 4 to 12 and a phenoxypolyether at a pH of greater than 9.5 to a temperature of 85 to 95° C. and removing as separate liquids a solution of a salt of the fluoroalkanoic acid and the phenoxypolyether and thereafter extracting the fluoroalkanoic acid from the said solution.

The recovery of the fluoroalkanoic acid and the phenoxypolyether from the liquid residue obtained on coagulating or concentrating a stabilized dispersion of polytetrafluoroethylene depends on the deactivation of the polyether prior to the recovery of the fluoroalkanoic acid. No practical method was found whereby the fluoroalkanoic acid could be recovered in the presence of the phenoxypolyether since calcium, barium or other water insoluble salts of perfluoroalkanoic acid do not precipitate in the presence of useful concentrations of such ethers. Steam distillation generally employed for the purification of the fluoroalkanoic acids could not be employed in the presence of phenoxypolyether since the latter caused foaming of the solution during distillation. The removal of the polyether from the solution is only partially successful when an extraction at ordinary temperatures with an organic solvent is employed. Due to the high solubility of the polyether in an aqueous medium at room temperature, very large amounts of the organic solvent are required to remove the ether. Even if relatively large amounts of solvent are used, sufficient polyether is still present to interfere with the recovery of the fluoroalkanoic acid.

In accordance with the present invention, it was discovered that phenoxypolyethers obtained from the reaction of phenols with ethylene oxide could be substantially removed from a solution containing both the ether and salts of the fluoroalkanoic acid if the solution was heated to a temperature of 85 to 95° C. It was found that at these temperatures the phenoxypolyether was insoluble in the aqueous medium and consequently separated from the solution to form a separate layer while the perfluoroalkanoic acid remains in solution. The layer so formed was found to contain a significant quantity of water dissolved in a polyether, but by increasing the pH of the solution to above 9.5 prior to heating, the water content could be reduced to 20 to 40% of the polyether. The residual quantities of the phenoxypolyether remaining in the aqueous phase on separation of the two layers is readily extracted at temperatures of 85 to 95° C. with reasonable quantities of an organic solvent such as perchloroethylene.

The liquid supernate obtained after separation of the phenoxypolyether contains primarily the fluoroalkanoic acid which, at the pH level indicated, exists in the form of the salt. Various means may be employed to remove the fluoroalkanoic acid. Thus, the resulting solution can be acidified by the addition of sulfuric acid until a pH of 1 to 2 is obtained and the acidified solution subjected to steam distillation. Other methods for removing the fluoroalkanoic acid, such as, by contact with an anionic exchange resin or precipitation through formation of insoluble salts, may also be employed.

The separation of the fluoroalkanoic acids from the phenoxypolyethers, according to the process of the present invention, is based on the insolubility of the phenoxypolyethers in water at elevated temperatures, and the solubility of salts of fluoroalkanoic acids under the same conditions. The process is thus independent of the concentration of the polyether and independent of the concentration of the fluoroalkanoic acid or its salt.

The process of the present invention is further illustrated by the following example:

To 2000 g. of a 30% aqueous dispersion of polytetrafluoroethylene containing 12 g. of ammonium perfluorocaprylate was added, 36 g. of "Triton" X—100, a commercially available ether of mono p-octyl phenol and ethylene oxide, and 1 g. of ammonium chloride. The resulting dispersion was heated to 80° C. and permitted to stand at that temperature for 30 minutes. At the end of 30 minutes approximately 1000 g. of a clear supernatant liquid could be poured off. The liquid was found to contain a maximum of 5.4 g. of the perfluorocaprylate and 25 g. of the "Triton" X—100.

To the clear supernatant liquid was added an ammonium hydroxide solution until the pH of the solution was 9.5. The solution was then heated to a temperature of 85 to 95° C. for a period of one hour. The clear solution formed two layers which were separated. The lower layer, comprising the viscous "Triton" X—100, was found to contain about 40% of water. On removing the water, 23 g. of the polyether was recovered. The remaining aqueous solution was extracted with tetrachloroethylene at a temperature of 85° C., employing 10% of the volume of the aqueous phase. An additional 1.7 g. of the phenoxypolyether was recovered in this way. The aqueous layer was then acidified with sulfuric acid until a pH of 1 to 2 was obtained. The acidified solution was subjected to steam distillation at atmospheric pressure and on distillation of 10% of the volume of the aqueous solution, 1.2 g. of the perfluorocaprylic acid was isolated.

The separation of fluoroalkanoic acids and their salts, according to the process of the present invention, is equally satisfactory with salts of such fluoroalkanoic acids as hexadecafluorononanoic acid $$H—(CF_2)_8—COOH$$

perfluorooctanic acid $F—(CF_2)_7—COOH$, dodecafluoroheptanoic acid $H—(CF_2)_6—COOH$, when these compounds are employed as dispersing agents in the dispersion polymerization of tetrafluoroethylene.

Phenoxypolyethers useful as dispersing agents in the polymerization of tetrafluoroethylene to aqueous dispersions of polytetrafluoroethylene have the general formula

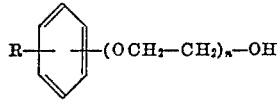

where R is an alkyl group and $n$ varies from 8 to 14. The phenoxypolyethers are commercially available under the trade name "Triton."

Although the example hereinabove has illustrated the present invention with respect to the para-octyl-phenoxypolyether only, it is to be understood that the separation or full recovery of fluoroalkanoic acids may also be carried out in the presence of other phenoxypolyethers employed as dispersing and stabilizing agents in the polymerization of tetrafluoroethylene.

Various modifications of the process steps, illustrated in the above example, will occur to those skilled in the art, and are within the scope of the present invention. Thus, it is not actually necessary to separate the two layers formed on heating the solution containing the phenoxypolyether and the fluoroalkanoic acid or its salt, but the steam distillation of the fluoroalkanoic acid may be carried out in the presence of the ether, where the ether exists in an undissolved form.

The process of the present invention is useful in recovering dispersing agents from waste liquors resulting in the concentration and coagulation of stabilized dispersions of polytetrafluoroethylene and thus aids in decreasing the cost of producing aqueous dispersions of polytetrafluoroethylene.

I claim:

1. A process for separating the ammonium salt of a fluoroalkanoic acid having the general formula $$X—(CF_2)_n—COOH$$

wherein X is a member of the class consisting of hydrogen and fluorine and $n$ is a number from 4 to 12, from a p-octyl phenoxypolyether having the general formula:

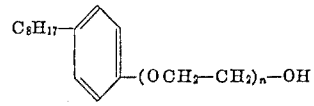

where $n$ varies from 8 to 14, which comprises heating an aqueous solution of said components, at a pH of greater than 9, to 85° to 90° C., and thereafter removing at said temperature as separate liquids a solution of said salt of a fluoroalkanoic acid and said phenoxypolyether.

2. The process, as set forth in claim 1, wherein the fluoroalkanoic acid is perfluorocaprylic acid.

No references cited.